US009820444B2

(12) United States Patent
Held

(10) Patent No.: US 9,820,444 B2
(45) Date of Patent: Nov. 21, 2017

(54) LOPPER

(71) Applicant: MTD Products Inc, Valley City, OH (US)

(72) Inventor: Peter Held, Scheuerfeld (DE)

(73) Assignee: MTD PRODUCTS INC, Valley City, OH (US)

(*) Notice: Subject to any disclaimer, the term of this patent is extended or adjusted under 35 U.S.C. 154(b) by 0 days.

(21) Appl. No.: 14/813,851

(22) Filed: Jul. 30, 2015

(65) Prior Publication Data
US 2016/0029571 A1 Feb. 4, 2016

(30) Foreign Application Priority Data
Jul. 30, 2014 (DE) .................. 10 2014 011 352

(51) Int. Cl.
| A01G 3/08 | (2006.01) |
| A01G 3/025 | (2006.01) |
| B25G 1/04 | (2006.01) |

(52) U.S. Cl.
CPC ............. *A01G 3/0255* (2013.01); *B25G 1/04* (2013.01)

(58) Field of Classification Search
CPC ............................... A01G 3/0255; B25G 1/04
USPC ................... 30/251, 294, 249, 250
See application file for complete search history.

(56) References Cited

U.S. PATENT DOCUMENTS

| 2,744,322 A * | 5/1956 | Gustafson ............ A01G 3/0255 30/249 |
| 3,623,222 A | 11/1971 | Akers |
| 4,760,645 A | 8/1988 | Davis |
| 5,084,975 A * | 2/1992 | Melter .................. A01G 3/025 30/245 |
| 5,341,572 A * | 8/1994 | Michelson ............ A01G 3/033 30/228 |

(Continued)

FOREIGN PATENT DOCUMENTS

| DE | 561668 | 10/1932 |
| DE | 816616 | 10/1951 |

(Continued)

OTHER PUBLICATIONS

European Search Report for European Patent Application No. 15 00 2210 dated Dec. 11, 2015.

*Primary Examiner* — Omar Flores Sanchez
(74) *Attorney, Agent, or Firm* — Wegman, Hessler & Vanderburg

(57) ABSTRACT

A lopper a lopping assembly mounted to an upper end of a pole, said lopping assembly includes a movable knife and a counter knife. The movable knife is connected via a first transmission and connection assembly to an operating assembly disposed at a lower end of the pole, which is configured to move the movable knife and/or the counter knife in a direction to one another. The operating assembly includes first and second actuating elements. The first actuating element is coupled to the first transmission and connection assembly and the second actuating element is coupled via a second transmission and connection assembly and releasable latching assembly to the first actuating element. Movement of the second actuating element away from the first actuation element causes, via the second transmission and connection assembly, a movement of the first actuating element in said first direction.

5 Claims, 5 Drawing Sheets

(56) References Cited

U.S. PATENT DOCUMENTS

| | | | |
|---|---|---|---|
| 2009/0038162 A1* | 2/2009 | Shan | A01G 3/0255 30/249 |
| 2010/0192385 A1* | 8/2010 | Pittau | A01G 3/0255 30/249 |
| 2011/0016730 A1* | 1/2011 | Wu | A01G 3/0255 30/249 |
| 2011/0113635 A1* | 5/2011 | Lee | A01G 3/0255 30/194 |
| 2011/0219629 A1* | 9/2011 | Wu | A01G 3/0255 30/249 |
| 2011/0271532 A1* | 11/2011 | Wu | A01G 3/0255 30/249 |
| 2012/0167396 A1* | 7/2012 | Wu | A01G 3/0255 30/249 |

FOREIGN PATENT DOCUMENTS

| | | |
|---|---|---|
| DE | 10130452 | 1/2003 |
| DE | 20 2005 018787 | 4/2006 |
| FR | 2 462 094 | 2/1981 |

\* cited by examiner

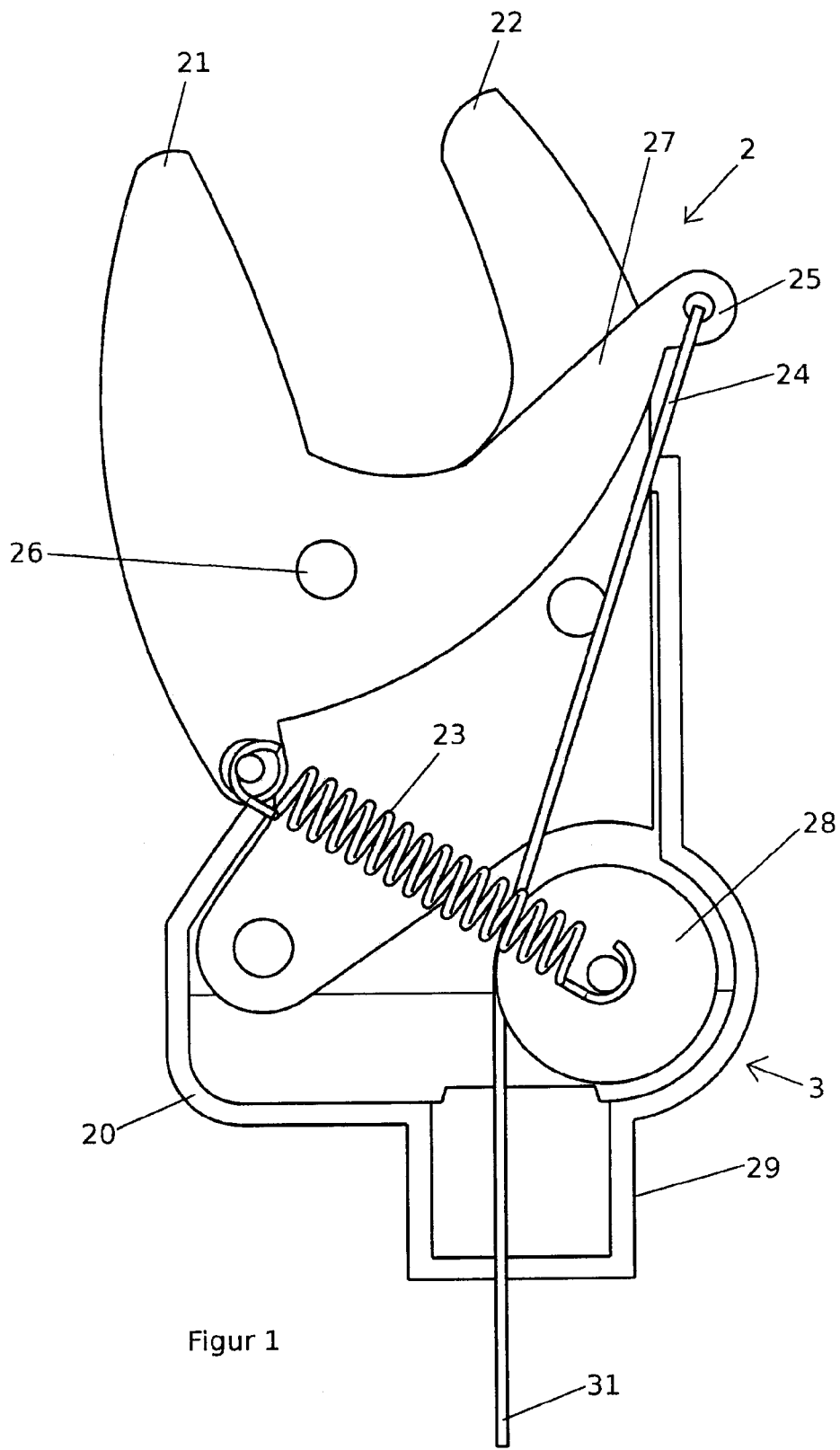
Figur 1

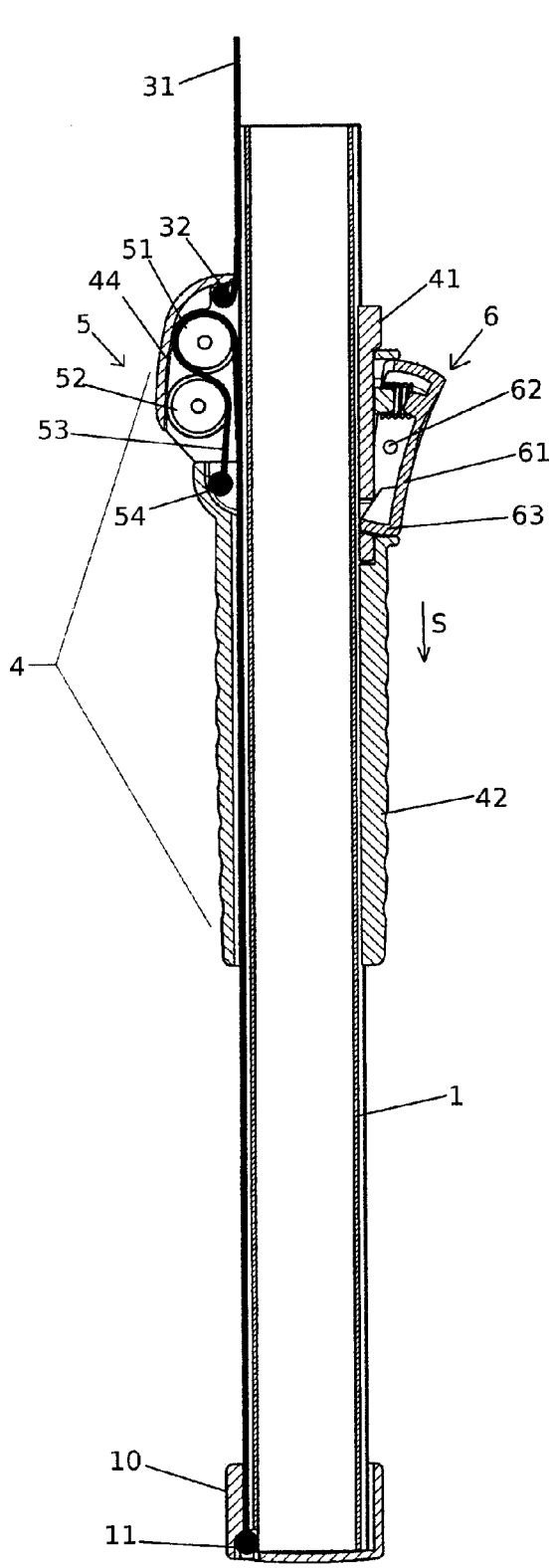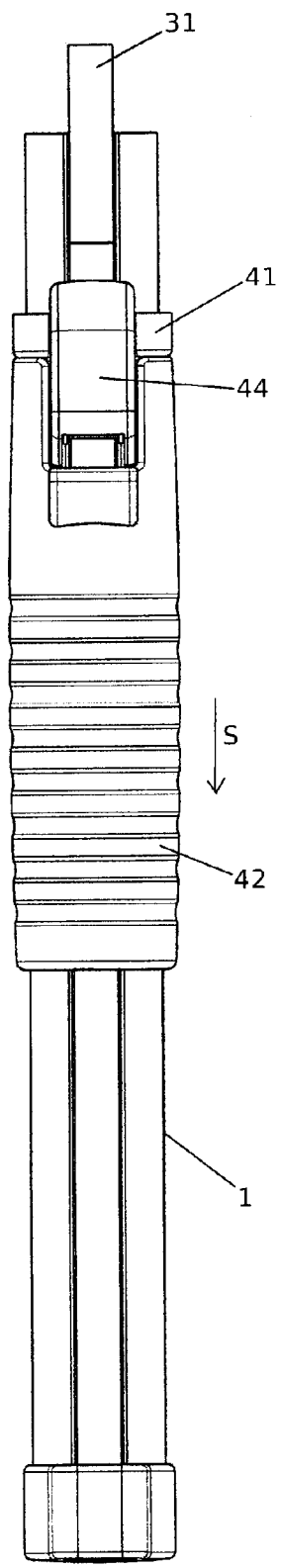
Figur 2
Figur 3

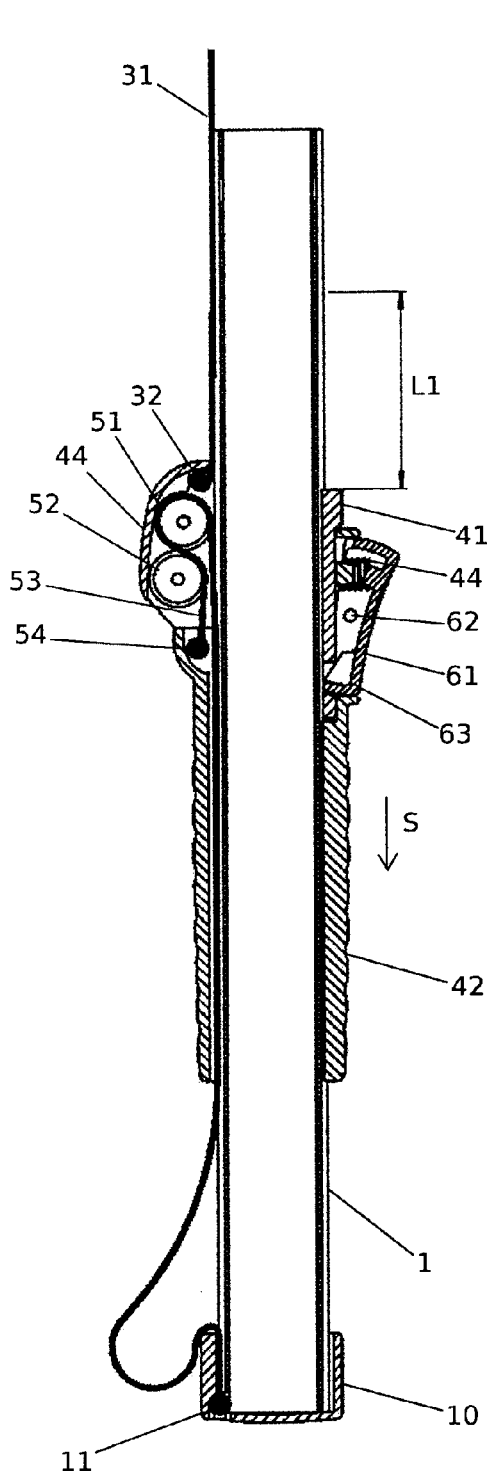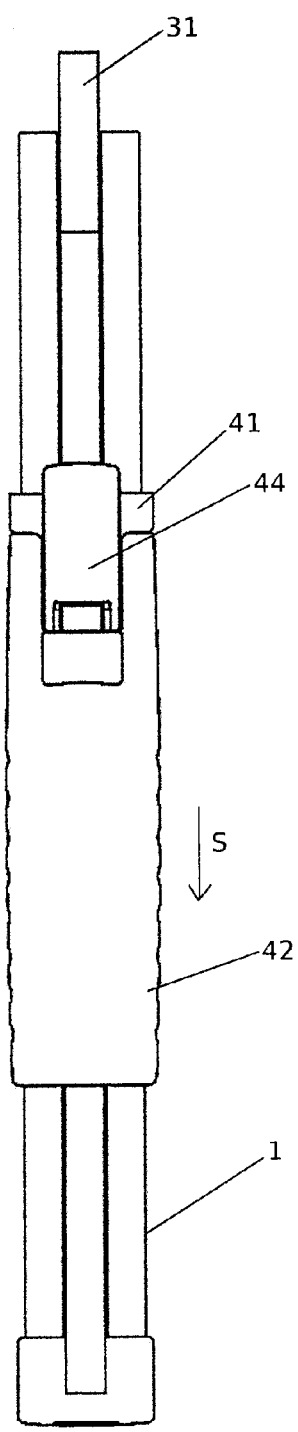
Figur 4               Figur 5

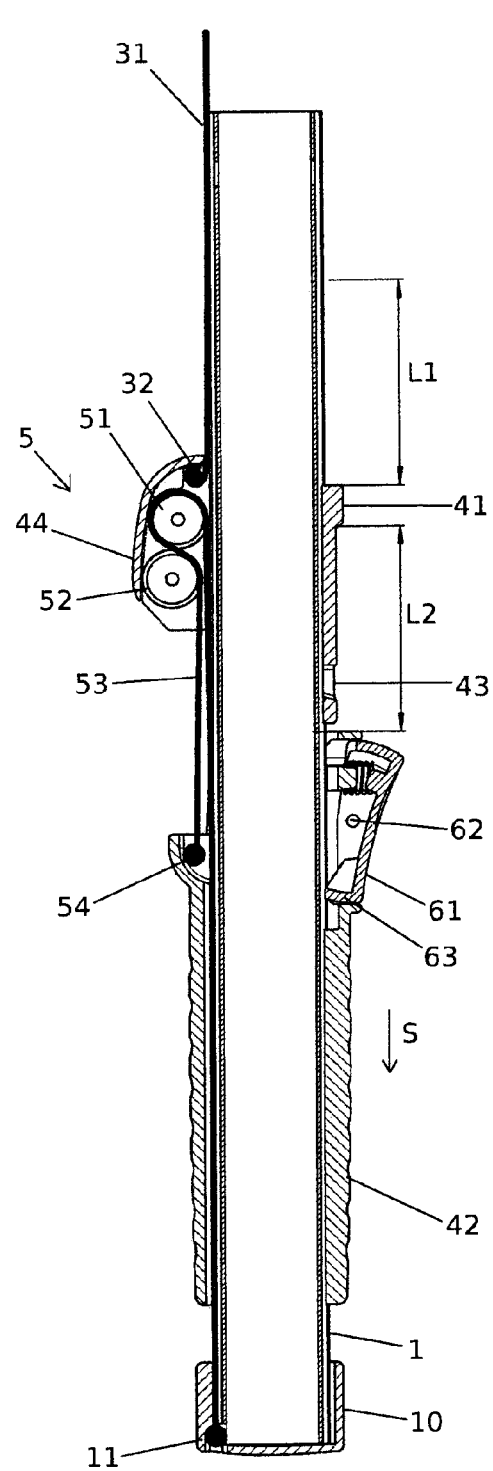
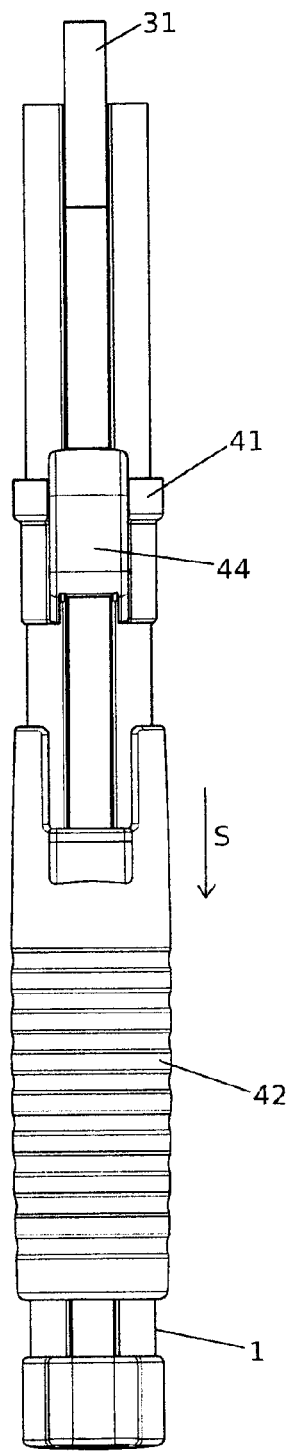
Figur 6
Figur 7

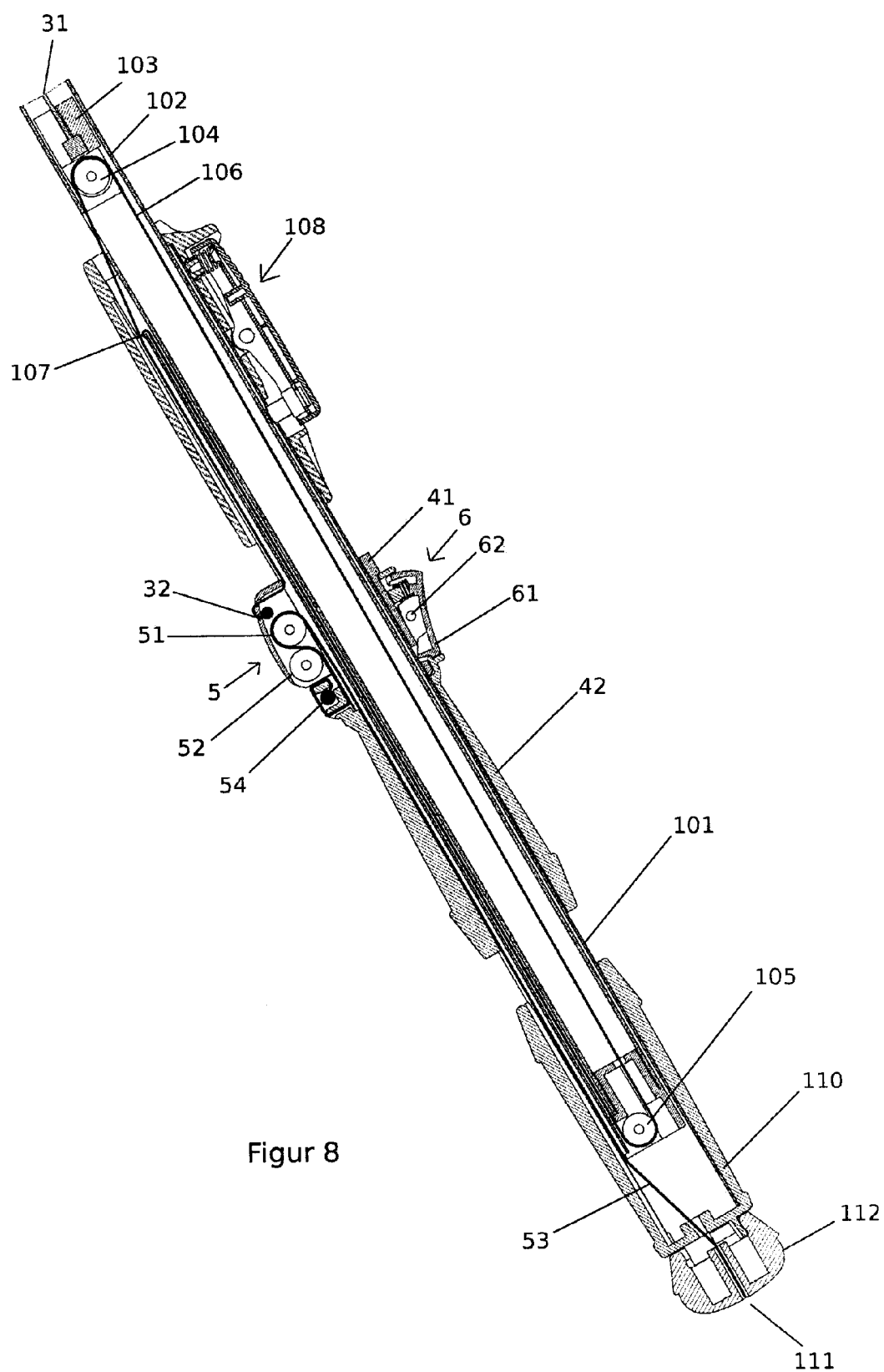
Figur 8

LOPPER

FIELD OF THE INVENTION

The invention relates to a lopper or pruning shears.

BACKGROUND OF THE INVENTION

Several constructions of such loppers are known, and many constructions commonly having a construction comprising an elongated pole having an upper end to which a lopping assembly is mounted, comprising a movable knife and a counter knife which possibly is also movable, and which are movable in a direction towards one another, the movable knife and the counter knife being held in the open position by resilient means and are movable in a direction towards one another in a cutting direction by a force exerted thereon by actuating means disposed in the region of the lower end of the rod via a transmission and connection means.

The transmission and connection means may be formed by pull cables, gears and/or chain gear arrangements.

It is known that on cutting of wood, depending on the geometry of the cutting edge of the knife, mostly in the middle region or near the end of the cutting process, an increase of the cutting forces occurs, which are compensated by these means, thereby are adapted to the strength of the user.

On this reason, shears for cutting of branches or of underwood are known which do not operate in the course of the cutting action with a constant transmission ratio between the movement of the cutting edge of the knife and the actuation force.

From the DE 816616, an example of a lopper is known wherein transmission and connection means are formed by a pull cable drive having a first end attached to a crank lever connected to the movable knife, wherein the pull cable attached the crank lever approaches a substantially perpendicular position relative to the longitudinal axis of the crank lever or lever arm on approaching closed position of the knifes. In this manner, the shearing force increases continuously on progressively approaching the closed position of the knifes, such that the cutting of even thicker branches is facilitated. The actuating means disposed at the lower end of the pole is formed by a lever transmission having a load arm connected to the knifes via pull cable hoist of the type of a block and tackle system and having a force arm formed by a pivotable lever.

Further, loppers or pruning shears are known which use for instance a change of a handle length or a change of the coupling position of linkages for obtaining adjustable transmission ratios.

DE 101 30 452 A1 discloses a lopper comprising a gear box switchable between at least two gear shift positions within the force transmission path from the lopping assembly to the actuating means. The switching between the gear box transmission ratios is performed by means of control elements within the region of the lopping assembly.

U.S. Pat. No. 4,760,645 discloses a lopping assembly of lopper wherein the variation between two or more transmission ratios of a transmission and connection means between the movable knifes and a pull rope is obtained by an adjustable variation of the length of a lever arm forming part the movable knife. Also in this case, the switchover between the gear box positions is performed via elements disposed in the region of the lopping assembly so that the lopper first has to be removed from the tree.

The DE 561668 discloses a lopper wherein a movable knife of the lopping assembly is connected to via toothed wheels to a lever arm having a free end which is connected via a pull cable to an actuating means, both the toothed wheels as well as the pull rope provide a transmission resulting in reduction of the force exerted on the actuating means relative to the force acting on the lopping assembly.

Further, U.S. Pat. No. 2,744,322 discloses lopper or pruning shears wherein the free end of a connection rod is connected to the lever arm of a movable knife. The actuation means is formed by a sliding sleeve surrounding the lower end of the rod and connected by a pull cable drive of the type of a sheave or block and tackle system to the lower end of the connection rod.

Both the pull cable drive as well as the actuation rods may be disposed within a hollow tube forming the pole and extend through this hollow rod, or they may be disposed closely adjacent to the pole on the outer side thereof. The pole itself may be a telescopic pole to allow an adaption to the height position of the branch or the like to be cut.

SUMMARY OF THE INVENTION

The problem to be solved by the present invention is to provide a lopper or pruning shears of the type mentioned above which facilitates a variation of the transmission ratio between a movement of the actuating means and the movement of the lopping assembly in a simple manner.

Advantageous embodiments and developments are set out in the respective subclaims.

By the construction of the lopper or pruning shears according to the invention, it is made possible to obtain a variation of the transmission ratio possibly even during the course of the cutting movement of the lopping assembly without interrupting the closing movement of the lopping assembly or performing a change of the gear transmission ratio at the lopping assembly itself at the upper end of the pole.

By simple releasing the latch connection between the two actuating elements of the operating handle forming the actuation means, the second actuating element may be moved via an additional second transmission ratio relative to the first actuating element, and during this movement of the second actuating element, the first actuating element of the operating handle will be moved further in its actuating direction.

BRIEF DESCRIPTION OF THE DRAWINGS

Embodiments of the invention will be discussed in the following with reference to the drawings.

In spite of the fact that with the embodiments disclosed in the following, the individual transmission and actuating means are described as being embodied by a pull cable drive of the type of a block and tackle system, it is of course also possible to embody the drive means by means of gear, chain and or toothed rack drives or other transmission means.

In the drawings:

FIG. 1 shows a known lopping assembly of a lopper for explaining the invention;

FIG. 2 shows a cross sectional view of an embodiment of the pole of a lopper provided with one embodiment of the actuation means of the lopping assembly;

FIG. 3 shows a front view of the embodiment of the actuating means of FIG. 2 as seen from the left hand side in FIG. 2;

FIG. 4 shows a cross-sectional view of the actuating means according to the FIGS. 2 and 3, wherein the latching means is latched and following a movement of the operating handle in a direction towards the lower end of the pole:

FIG. 5 shows a front view of an embodiment of the actuation means in the position of FIG. 4 in a front as seen from the left hand side in FIG. 4;

FIG. 6 shows a cross-sectional view of the actuation means according to FIGS. 2 and 3 after releasing the latching means and the movement of the second actuation element away from the first or coupling element;

FIG. 7 shows a front view of the actuation means in the position of FIG. 6 in a front view as seen from the left hand side in FIG. 6;

FIG. 8 shows an embodiment of the actuation means according to the FIG. 2 through 7 for use in a lopper having a telescopic pole.

DETAILED DESCRIPTION

FIG. 1 does show a lopping assembly 2 of a lopper in schematic manner. This embodiment of the lopping assembly 2 comprises a housing or a base plate 20 indicated only schematically, a movable knife 21 and a stationary counter knife 22. The movable knife 21 is pivotably mounted about a pivot axis 26 on the base plate 20 and is biased by means of a spring 23 into the open position to permit the gripping of a branch or other wood. The knife 21 comprises a lever extension 27, to which a first transmission and connection assembly 3 formed by a pull cable 24 and a deflection roll 28 is attached at a mounting position 25, via which the knife 21 may be moved into the closed position of the lopping assembly to permit the cutting of a branch. The base plate 20 of the shears assembly 2 is mounted by means of a mounting tang 29 to the upper end of a pole shown in FIGS. 2 through 8. A lower end of the pull cable 24 is connected to the actuating means 4 shown in FIGS. 2 through 8.

The first transmission and connection means 3 may be formed for instance in the manner known from the DE 816616 as a pull cable in a manner such that in the middle range or on further approaching the end of the cutting movement, where an increase of the resistive force of the object to be cut occurs, a maximal transmission ratio of the first transmission and connection means 3 is obtained which may for instance be obtained by an arrangement wherein in this region the angle between a connecting line between the pivot axis 26 and the attachment position 25 of the pull cable 24 on one hand and the longitudinal axis of the pull cable 24 between the attachment position 25 and a tangent of the pull cable at the deflection or idler roll 28 becomes a right angle.

In spite of the fact that in FIG. 1 a lopping or knife assembly is shown wherein the movable knife 21 is movable towards a counter knife or anvil by the first transmission and connection means 3 in a direction towards the anvil 22, of course also embodiments are conceivable wherein both the movable knife 21 as well as the counter knife 22 are pivotably mounted on the base plate about a pivot axis and movable towards one another on exerting a force by means of the pull rope 31 of the first transmission and connection means.

In spite of the fact that in FIG. 1 a simple pull cable transmission is shown, this pull cable 24 transmission may also comprise in a known manner per se a flask or block and tackle system to obtain a further force transmission ratio.

It is further possible to replace the lever directly connected to the movable knife 21 and/or the stationary counter knife and pull rope 24 by a lever or gear transmission forming at least part of the first transmission and connection means 3.

With assemblies wherein the force transmission to the lopping assembly is made via a gear assembly, it is possible in the same manner as above, to design this gear assembly in a manner that in a certain region of the knife movement a maximal force exertion is obtained.

In FIGS. 2 and 3, a cross-sectional view and a front view, respectively, of a first embodiment of the operating means 4 according to the present invention is shown, comprising a first or coupling element 41 and a second or handle element 42. The coupling element 41 is connected at an attachment point 32 to the lower free end of the pull cable or a pull tape 31 of the first transmission and connection means 3, for instance of the type shown in FIG. 1.

The actuating means 4 is slidably movable along the pole in a manner shown in FIG. 4 in the direction of the arrow S towards the lower end of the pole 1 to exert a pull force onto the pull rope 31 and thereby to move the movable knife 21 against the anvil 22.

The handle element 42 is coupled to the coupling element 41 via a releasable latch means 26 in a positive locking manner, as shown in FIG. 2.

While the latch means 6 may have any construction, in FIG. 2 an especially simple arrangement is shown wherein an operating knob 61 is pivotably mounted to an axis 62 perpendicular to the longitudinal axis of the pole at the handle element and is provided with a latch projection 63 resiliently biased into engagement with a latch groove 43 (FIG. 6) of the coupling element 41.

By exerting a pressure onto the pivotable operating knob 61, the latch connection between the handle element 42 and the coupling element 41 may be released, such that the handle element 42 may be moved away from the coupling element 41 along the pole 1 in a direction indicated by the arrow S.

This handle element 42 is connected via a second transmission and connection means 5 to the coupling element 41, said transmission and connection means 5 being formed, with the embodiment shown, also by a pull cable, but also might be formed by a rack, chain or gear drive arrangement.

The second transmission and connection means 5 is disposed within the coupling element 41 and comprises two deflection or idler rolls 51, 52 which are arranged one above the other in the longitudinal direction of the pole and are disposed below a cover 44 attached to the coupling element 41, as well as the pull cable or pull tape 53.

The pull cable or pull tape 53 extends in the manner shown in FIGS. 2 through 7 from an attachment point 11 located in a covering cap 10 at the lower end of the pole and along the pole 1 and through a recess within the handle portion 42 to the upper idler roll 51 and then around the lower idler roll 52 to a second attachment point 54 at the upper end of the handle element 42.

As already discussed, the movable knife 21 is closed relative to the counter knife 22 by exerting a pull force onto the pull cable 31 on moving the handle element 42 of the operating means 4 in the direction of the arrow S towards the lower end of the pole 1, whereby the first transmission and connection means 3 formed on the lopper assembly 2 resulting in an increase of the pull force with a simultaneous elongation of the movement path L1 of the handle element 4, as shown in FIGS. 4 and 5.

If it is recognized during the process of the closing movement of the lopping assembly 2 that the force required for closing the shears assembly becomes relative large in spite of the presence of the first transmission and connection means 3, the latch connection between the coupling element 41 and the handle element 42 may be released by simply pressing down the operating button 61, such that the handle element 42 may be moved away from the coupling element.

Subsequently, via the second transmission and connection means 5 comprising the pull cable 53 and the idler rolls 51, 52, a further transmission ratio of the force exerted by the handle element 42 onto the clutch element 41 and thereby onto the pull rope 31 is obtained on a simultaneous increase of the movement path of the handle element 42 by the distance L2 as may be seen from FIGS. 6 and 7.

In this manner, without interruption, an increase of the exerted force for closing the shears assembly 2 is possible.

This may especially be seen from a comparison of the FIGS. 2 and 4. FIG. 4 shows the coupling element 41 coupled to the handle element via the latching means 6, such that on a movement of this combined unit 41, 42 over the distance L1 downwardly the pull cable 31 for the lopping assembly also is drawn over the distance L1 downwardly.

On pressing the operating button 61, the latching between the coupling element 41 and the handle element 42 is released, and the movement of the handle element 42 is transmitted via the second transmission and connection means 5 of the type of a flask or block and tackle system onto the coupling element 41.

For a movement of the pull cable over a distance L1 therefore by now a movement of the handle element 42 of L1+L2 is required which results in a corresponding increase of the force exerted by the handle element 42 onto the pull rope 31.

This means that the handle element 42 with a latched operating button 41 is acting with a transmission ratio of 1:1 onto the pull rope 31 whereas on releasing the latch between the coupling element 41 and the handle element, there will be a transmission ratio of 2:1.

Therefore, there is the possibility to cut thin branches in the fast cutting position with a first transmission ratio of the second transmission and connection means of 1:1, and to switch over for thicker branches without any interruption by releasing the latching by the latching means 6 and thereby switching over to a forceful cutting position having a transmission ratio of 2:1.

For changing the transmission ratio, the lopper needs not be removed from the top of the tree, but the switching over to the more forceful cutting may be performed during the cutting procedure if the user recognizes that the required cutting force is surprisingly high.

In FIG. 8, the same basic principle as shown in FIGS. 2 through 7 is shown in an embodiment of a lopper with a telescopically extensible pole which comprises with this embodiment an outer tube 101 and inner tube 102 which supports a lopping assembly 2 not shown in this Figure. The representation according to FIG. 8 is only schematical and not to scale as regards its respective dimensions and distances.

The inner tube 102 may be drawn out of the outer tube 101 and may be locked relative to the outer tube by an arrresting means 108 at a desired total length. At the bottom end of the outer tube 5, there is mounted a lower handle portion 110.

With this embodiment, the pull cable is guided within the tubes. Telescopic poles wherein the pull cable is guided within a tube have the advantage that the length of the pull cable or actuating rope does not have to be adapted to the changed length of the telescopic pole. The position of the actuating means 4 positioned on the outer tube 101, and thereby of the coupling element 41 and the handle element 42 for actuating the lopping assembly remains constant even if the total length of the pole is varied.

With the embodiment shown in FIG. 8, the lower end of the pull rope 31 is attached to a sliding sleeve 103 which is slidably supported within the inner tube and carries, at its bottom end, an upper idler roll 104. At the lower end of the inner tube 102, a lower idler roll 105 is rotatably supported.

An actuating rope 105 extends from an attachment point 107 at the upper end of the outer tube 101 to the lower idler roll 105 and from this lower idler roll 105 via the upper idler roll 104 and out of the inner tube 102 to an attachment point 32 at the coupling element 41.

The coupling element 41 and the handle element 42 as well as the second transmission and connection means are disposed on the outer tube 101 and correspond, as regards their construction and its working, substantially to the embodiment described with reference to the FIGS. 2 to 7.

The pull cable or pull tape 53 extends with the embodiment shown in FIG. 8 from the attachment point 111 in a knob 112 disposed at the lower end of the hand grip 110 and through a cut-out through the handle 110 and the handle element 42 to the upper idler roll 51 and then extends around the lower idler roll 52 to a second attachment point 54 at the upper end of the handle element 42.

The invention claimed is:

1. A lopper comprising:
a lopping assembly mounted to an upper end of a pole, said lopping assembly comprising a movable knife and a counter knife, the movable knife being connected via a first transmission and connection means to an operating means disposed in a region of a lower end of the pole, said operating means being adapted to move the movable knife and/or the counter knife in a direction toward one another on a movement of said operating means in a first direction,
wherein said operating means comprises a first actuating element and a second actuating element, in that the first actuating element is coupled to the first transmission and connection means, in that the second actuating element is coupled via a second transmission and connection means and releasable latching means to the first actuating element and is movable, on releasing said latching means, away from the first actuating element in said first direction,
wherein a movement of the second actuating element away from the first actuation element causes, via the second transmission and connection means, a movement of the first actuating element in said first direction, and
wherein said second transmission and connection means is constituted by a pull cable comprising a pull rope extending from an attachment point at the upper end of said second actuating element via deflection rolls rotatably mounted to said first actuating element to a mounting position at the lower end of said pole.

2. The lopper according to claim 1, wherein the first and/or the second transmission and connection means are constituted by a pull cable hoist of the type of a block and tackle system.

3. The lopper according to claim 1, wherein the first transmission and connection means is adapted to exert an increasing force action over the course of the closing movement of the movable knife in a direction towards the counter knife.

4. The lopper according to claim 1, wherein the pole is a telescopic rod comprising an outer tube and an inner tube slidably movable within the outer tube in longitudinal direction, and in that the second transmission and connection means is disposed at the outer tube.

5. A lopper comprising:
a lopping assembly mounted to an upper end of a pole, said lopping assembly comprising a movable knife and a counter knife, the movable knife being connected via a first transmission and connection means to an operating means disposed in a region of a lower end of the pole, said operating means being adapted to move the movable knife and/or the counter knife in a direction toward one another on a movement of said operating means in a first direction,
wherein said operating means comprises a first actuating element and a second actuating element, in that the first actuating element is coupled to the first transmission and connection means, in that the second actuating element is coupled via a second transmission and connection means and releasable latching means to the first actuating element and is movable, on releasing said latching means, away from the first actuating element in said first direction,
wherein a movement of the second actuating element away from the first actuation element causes, via the second transmission and connection means, a movement of the first actuating element in said first direction,
wherein the pole is a telescopic rod comprising an outer tube and an inner tube slidably movable within the outer tube in longitudinal direction, and in that the second transmission and connection means is disposed at the outer tube, and
wherein the lower end of the pull cable of the lopping assembly is secured to a sliding sleeve slidably mounted within the inner tube and carrying at its lower end an upper deflection roll, a lower deflection roll being rotatably mounted to the lower end of the inner tube, and in that an actuating cable is extending from an attachment point at the upper end of the outer tube to the lower deflection roll and therefrom via the upper deflection roll and out of the inner tube to an attachment point at the coupling element of the transmission and connection means.

* * * * *